June 17, 1952 R. J. SWANSON 2,600,589

MAGNETIC CASE FOR ELONGATED ARTICLES OF MAGNETIC MATERIAL

Filed June 18, 1947

INVENTOR.

ROLAND JOSEPH SWANSON

BY

Whittemore Hulbert & Belknap

ATTORNEYS

Patented June 17, 1952

2,600,589

UNITED STATES PATENT OFFICE 2,600,589

MAGNETIC CASE FOR ELONGATED ARTICLES OF MAGNETIC MATERIAL

Roland Joseph Swanson, Ann Arbor, Mich.

Application June 18, 1947, Serial No. 755,437

13 Claims. (Cl. 223—109)

This invention relates to a case for elongated articles of magnetic material such as needles, straight pins and hair pins.

One of the objects of this invention is to provide a small compact case for storing needles, pins or similar articles and for retaining the articles against accidental displacement.

Another feature of this invention is to provide a case of the above general type particularly adapted for use in storing articles formed of a ferrous metal or some similar magnetic material and having a permanent magnet incorporated therein for holding the articles in position in the case.

A further object of this invention is to provide a case of the type briefly described above, wherein the permanent magnet is positioned to enable use of the case to pick up magnetic articles such as needles or pins.

A still further object of this invention is to provide a case constructed to accommodate spools of thread as well as pins or needles, and having magnetic means for retaining the spools as well as the needles and/or pins in position within the case.

The foregoing as well as other objects will be made more apparent as this description proceeds, especially when considered in connection with the accompanying drawings, wherein.

Figures 1, 2, 3, 4, 5, 6, 7, 8, 9, 10:
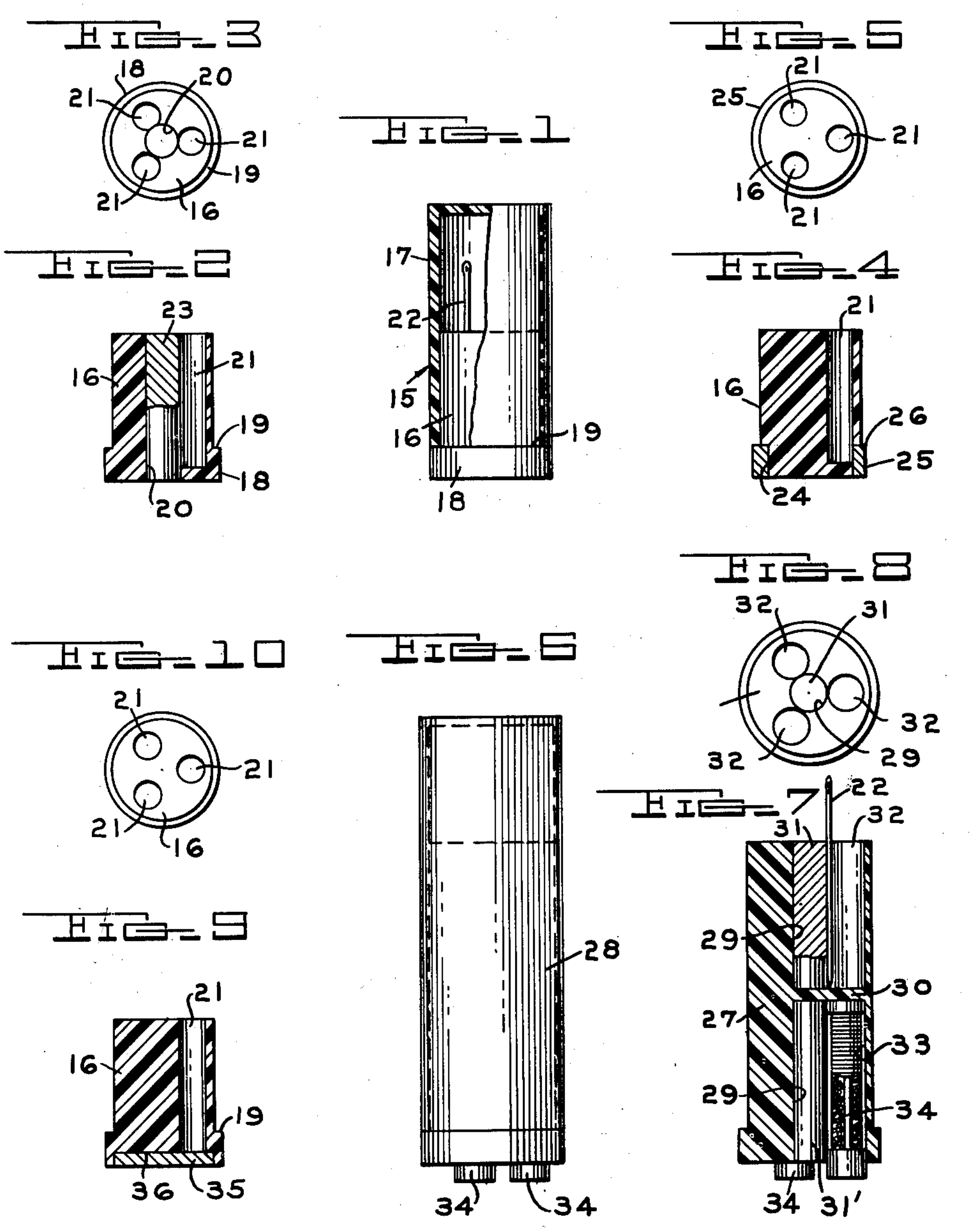
Figure 1 is a side elevational view partly in section of a needle carrying case embodying the features of this invention.
Figure 2 is a side elevational view partly in section of the body portion of the case shown in Figure 1.
Figure 3 is a plan view of the body portion shown in Figure 2.
Figure 4 is a vertical sectional view through the body portion of a modified form of construction.
Figure 5 is a plan view of the construction shown in Figure 4.
Figure 6 is a side elevational view of a further embodiment of this invention.
Figure 7 is a vertical sectional view through the body portion of the modification shown in Figure 6.
Figure 8 is a plan view of the construction shown in Figure 7.
Figure 9 is a vertical sectional view through still another modification.
Figure 10 is a top plan view of the construction shown in Figure 9.

Referring first to the embodiment of the invention shown in Figures 1 to 3 inclusive, it will be noted that the reference numeral 15 designates generally a needle carrying case comprising a body 16 and a cap 17. The body and cap may be formed of any suitable non-magnetic material, such for example, as plastic, glass, wood or any one of the various available composition materials.

In any case the body 16 is preferably cylindrical, and is formed at the lower end with an enlarged base 18 providing an annular shoulder 19 at the outer side of the body. The body 16 is drilled or otherwise formed with an axially extending bore 20 extending from the upper end of the body through the base 18 of the latter. The body 16 is also formed with a plurality of recesses in the form of bores 21 spaced equal distances from each other in concentric relation to the bore 20 and intersecting the latter throughout the length thereof. The bores or recesses 21 are open at the top to receive articles of magnetic material, such for example, as pins, needles, or the like, and terminate short of the bottom of the body in the manner clearly shown in Figure 2 of the drawing. In Figure 1 of the drawing an article of magnetic material in the form of a needle 22 is shown as positioned in one of the recesses 21, and it will be noted that the length of the latter is preferably less than the length of the needle 22 to enable a substantial portion of the needle to extend above the body where it may be conveniently grasped by the user.

A permanent magnet in the form of a rod 23 is secured in the bore 20 with the opposite ends flush with the top and bottom surfaces of the body 16. Inasmuch as the recesses 21 intersect the bore 20, it follows that the registering portions of the rod 23 form parts of the side walls of the recesses 21. As a result needles or other articles of magnetic material inserted into the recesses 21 are held in position by the permanent magnet 23.

The cap 17 is shown in Figure 1 of the drawing as sleeved on the body 16, and the lower end of the cap is adapted to seat against the annular shoulder 19. The cap is of sufficient length to enable needles of various lengths to be supported in the body, and if desired, may be formed of a transparent material to display the contents of the recesses 21.

The embodiment of the invention shown in Figures 4 and 5 differs from the construction previously described in that the bore 20 and rod 23 are omitted. Also the body 16, instead of having an enlargement 18 at the lower end, is formed with a reduced portion 24 which intersects the lower ends of the recesses 21. A permanent magnet in the form of a ring 25 is sleeved on the reduced portion 24 in a manner to close the lower ends of the recesses 21 and provide an annular shoulder 26 for engagement with the cap 17. It follows from the above that the ring 25 forms parts of the side walls of the recesses 21, and thereby functions to retain articles of magnetic material within the recesses 21.

Referring now to the embodiment of the invention shown in Figures 6 to 8 inclusive, it will be noted that the body 27 is approximately double the length of the body portions 16 described above, and the cap 28 is correspondingly greater in length. The body 27 is formed with aligned axially extending bores 29 closed at the adjacent ends by a web 30 and adapted to respectively receive permanent magnets in the form of rods 31 and 31′ respectively. A plurality of recesses 32 are formed in the upper portion of the body in concentric relation to the magnet 31 and are open at the top of the body to enable articles of magnetic material to be inserted into the recesses 32.

As in the first-described form of the invention, the recesses 32 intersect the bore 29 throughout the lengths thereof to expose adjacent portions of the permanent magnet 31. Thus the magnet 31 serves to retain the articles in position in the respective bores 32.

Additional recesses 33 are formed in the lower portion of the body 27 in substantial axial alignment with the recesses 32. The recesses 33 are open at the lower end of the body, and are adapted to receive spools of thread 34, and these spools are preferably formed of a suitable magnetic material. These recesses also intersect the adjacent bore 29 to expose portions of the permanent magnet 31′ and permit the latter to contact the enlargements at the opposite ends of the spools 34 to retain the latter within the respective recesses 33.

The embodiment of the invention shown in Figures 9 and 10 is similar to the first described form of the invention except that the center bore 20 and rod type permanent magnet 23 are omitted. As shown in Figure 9 the recesses 21 extend entirely through the body 16 and are closed at the lower ends by a plate 35. The plate 35 is in the form of a permanent magnet, and is secured in a recess 36 formed in the bottom wall of the body 16.

In each of the various embodiments of the invention it will be noted that portions of the permanent magnet form parts of the walls of the article receiving recesses, so that the articles of magnetic material inserted in the recesses are engaged by the permanent magnet and held in position. Also in each of the several embodiments, the permanent magnet or a portion of the latter is exposed at the outer side of the body to enable the use of the body in picking up articles of magnetic material.

What I claim as my invention is:

1. A case of the general type described comprising a body of non-magnetic material having an axially extending bore and having recesses spaced around the bore, said recesses being open at the top of the body to receive articles of magnetic material and having openings in the side walls registering with the bore, and a permanent magnet in the form of a rod secured in the bore in registration with the openings in the side walls of the recesses.

2. A case of the general type described comprising a body of non-magnetic material having an axially extending bore and having recesses spaced around the bore, said recesses being open at the top of the body to receive articles of magnetic material and having openings in the side walls registering with the bore, a permanent magnet in the form of a rod secured in the bore in registration with the openings in the side walls of said recesses and having the lower end exposed through the bottom wall of the body, and a cap sleeved on the body for closing the open ends of the recesses.

3. A case of the general type described comprising a body of non-magnetic material having a plurality of recesses spaced from each other in concentric relation to the vertical axis of the body and open at the top of the body for receiving magnetic articles, and a permanent magnet in the form of a ring sleeved on the bottom of the body and forming parts of the walls of said recesses.

4. A case of the general type described comprising a body of non-magnetic material having a plurality of recesses spaced from each other in concentric relation to the vertical axis of the body and open at the top of the body for receiving magnetic articles, a permanent magnet in the form of a ring sleeved on the bottom of the body and forming parts of the walls of the recesses, and a cap sleeved on the top of the body and engageable with said ring.

5. A case of the general type described comprising an elongated body of non-magnetic material having a plurality of longitudinally extending adjacent recesses therein opening from one end of said body, and a bar magnet occupying one recess having the pole portions thereof adjacent to the opposite ends of another of said recesses to adapt the latter for receiving and retaining elongated articles of magnetic material.

6. A case of the general type described comprising an elongated body of non-magnetic material having a central longitudinally extending recess and a plurality of other recesses surrounding and parallel to said central recess, said plurality of recesses opening from one end of said body, and a bar magnet in said central recess having pole portions at opposite ends thereof adapted to hold elongated articles of magnetic material in parallelism within the surrounding recesses.

7. A case of the general type described comprising a cylindrical body of non-magnetic material having a central longitudinally extending recess and a series of surrounding recesses, a bar magnet in said central recess having pole portions adjacent to opposite ends thereof whereby elongated articles of magnetic material such as pins or needles when inserted in the surrounding recesses will be magnetically held in parallelism therein and with portions projecting outward beyond said recesses, and a cover having a portion telescopically engaging said cylindrical body, and a portion extending beyond the same for housing the projecting portions of said articles.

8. A needle case comprising an elongated non-magnetic body having an axial bore therein opening from the bottom; a bar magnet received in said bore; a plurality of bores opening from the top, being parallel to and intersecting the first mentioned bore tangentially; and a removable hollow cap sleeved on the upper end of said body, said cap being of such size as to leave a hollow at the upper end of said body into which the ends of needles stored in the plurality of bores may extend.

9. A needle case comprising an elongated non-magnetic body having an axial bore therein opening from the bottom; a bar magnet received in said bore; and a plurality of bores opening from the top, being parallel to and intersecting the first mentioned bore tangentially, the length of the body being substantially less than the needles to be stored therein.

10. A case for storing elongated metallic articles of magnetic material comprising a substantially cylindrical body of non-magnetic material and a permanent magnet mounted in said body, said case having a plurality of radially spaced apertures formed therein and opening from one end, a surface of said magnet forming a portion of the side wall of each of said apertures, and the walls forming said apertures being of a depth substantially less than the length of the articles to be stored.

11. A case for storing elongated metallic articles of magnetic material comprising a substantially cylindrical body and a removable cap therefor, said body comprising an element of non-magnetic material and a permanent magnet mounted in said element, said body having a plurality of radially spaced apertures formed therein and opening from the end at which said cap is attached, a surface of said magnet forming a portion of the side wall of each of said apertures, and the walls forming said apertures being of a depth substantially less than the length of the articles to be stored.

12. A case of the general class described comprising an elongated cylindrical body having a plurality of radially spaced apertures formed therein opening from the upper end, a magnet supported in said body having a surface forming the side wall of each of said plurality of apertures at the bottom thereof, and a hollow cylindrical cap removably sleeved on the upper end of said body, said body being substantially shorter than the minimum length article to be stored in the case and said cap projecting upwardly beyond the top of said body a distance substantially equal to the length of the body.

13. A case comprising a non-magnetic elongated cylindrical body having a plurality of radially spaced bores therein opening from the upper end, a bar magnet supported in said body, said magnet having a surface forming a portion of a sidewall of each of said plurality of bores, and a hollow cylindrical cap removably sleeved on the upper end of said body, said body being substantially shorter than the minimum length article to be stored in the case and said cap projecting upwardly beyond the top of said body a distance substantially equal to the length of the body.

R. JOSEPH SWANSON.

REFERENCES CITED

The following references are of record in the file of this patent:

UNITED STATES PATENTS

| Number | Name | Date |
|---|---|---|
| 559,176 | Hussey | Apr. 28, 1896 |
| 712,447 | Woolley | Oct. 28, 1902 |
| 1,952,596 | Lashar | Mar. 27, 1934 |
| 2,295,987 | Boxer | Sept. 15, 1942 |
| 2,458,970 | Wilson | Jan. 11, 1949 |

FOREIGN PATENTS

| Number | Country | Date |
|---|---|---|
| 24,943 | Great Britain | of 1898 |
| 338,656 | Great Britain | Nov. 27, 1930 |